US012282391B2

(12) United States Patent
Vishwanath et al.

(10) Patent No.: US 12,282,391 B2
(45) Date of Patent: Apr. 22, 2025

(54) SYSTEMS AND METHODS FOR ERROR RECOVERY IN REBOOTLESS FIRMWARE UPDATES

(71) Applicant: Dell Products, L.P., Round Rock, TX (US)

(72) Inventors: Manjunath Vishwanath, Bangalore (IN); Rama Rao Bisa, Bangalore (IN); Pavan Kumar Gavvala, Bangalore (IN); Manjunath Am, Bangalore (IN); Mahesh Babu Ramaiah, Bangalore (IN); Naveen Karthick Chandrasekaran, Bangalore (IN); Darshan Hebbar, Sagar (IN); Shantanu Kumar Pradhan, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 109 days.

(21) Appl. No.: 17/935,176

(22) Filed: Sep. 26, 2022

(65) Prior Publication Data

US 2024/0103971 A1 Mar. 28, 2024

(51) Int. Cl.
*G06F 11/14* (2006.01)
*G06F 8/65* (2018.01)
*G06F 11/20* (2006.01)

(52) U.S. Cl.
CPC .......... *G06F 11/1433* (2013.01); *G06F 8/65* (2013.01); *G06F 11/2012* (2013.01); *G06F 2201/865* (2013.01)

(58) Field of Classification Search
CPC .............. G06F 11/1433; G06F 11/2005; G06F 11/2012
See application file for complete search history.

(56) References Cited

U.S. PATENT DOCUMENTS 5,065,399 A * 11/1991 Hasegawa ............ H04Q 3/0079
370/907
10,467,111 B2 * 11/2019 Arroyo ................ G06F 11/2017
(Continued)

FOREIGN PATENT DOCUMENTS

EP 0436201 B1 * 6/1996

OTHER PUBLICATIONS

Wikipedia's I2C bus historical version published Jul. 22, 2022 https://en.wikipedia.org/w/index.php?title=I%C2%B2C&oldid=1099774976 (Year: 2022).*

*Primary Examiner* — Joseph O Schell
(74) *Attorney, Agent, or Firm* — Fogarty LLP

(57) ABSTRACT

Systems and methods include a remote access controller of an IHS (Information Handling System) that provides remote management of the IHS. The remote access controller initiates an update of firmware used to operate a hardware component of the IHS by transmitting a firmware image to the hardware component via a first signaling pathway connecting the remote access controller to the hardware component. The remote access controller detects a failure in transmission of the firmware image to the hardware component via the first signaling pathway and identifies a second signaling pathway connecting the remote access controller to the hardware component. The remote access controller resumes transmission of the firmware image to the hardware component via the second signaling pathway and the firmware used to operate the hardware component is updated using the transmitted firmware image.

18 Claims, 3 Drawing Sheets

(56) References Cited

U.S. PATENT DOCUMENTS

| | | | | |
|---|---|---|---|---|
| 10,606,784 | B1* | 3/2020 | Jreij | G06F 13/4282 |
| 11,811,590 | B2* | 11/2023 | Lee | H04L 41/0663 |
| 2015/0373115 | A1* | 12/2015 | Breakstone | G06F 11/2069 |
| | | | | 709/217 |
| 2016/0283221 | A1* | 9/2016 | Kochar | G06F 8/654 |
| 2018/0260352 | A1* | 9/2018 | Long | G06F 1/266 |
| 2020/0218527 | A1* | 7/2020 | Ganesan | G06F 8/65 |
| 2023/0216607 | A1* | 7/2023 | Ladkani | G06F 11/0748 |
| | | | | 714/752 |

* cited by examiner

SYSTEMS AND METHODS FOR ERROR RECOVERY IN REBOOTLESS FIRMWARE UPDATES

FIELD

The present disclosure relates generally to Information Handling Systems (IHSs), and relates more particularly to managing firmware used by IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Various hardware components of an IHS may operate using firmware instructions. From time to time, it is expected that firmware utilized by hardware components of an IHS may be updated. Such firmware updates may be made in order to modify the capabilities of a particular hardware component, such as to address security vulnerabilities or to adapt the operations of the hardware component to a specific computing task. When firmware updates are made to a hardware component of an IHS, it is preferable that the IHS experience no downtime and with minimal degradation in the performance of the IHS.

SUMMARY

In various embodiments, IHSs may include: one or more CPUs utilizing one or more buses that connect the CPUs to a plurality of hardware components of the IHS; a first of the plurality of hardware components of the IHS; and a remote access controller supporting remote management of the plurality of managed hardware components of the IHS, the remote access controller comprising a logic unit and a memory device having instructions stored thereon that, upon execution by the logic unit, cause the remote access controller to: initiate an update of firmware used to operate the first of the hardware components of the IHS, wherein a firmware image is transmitted to the first of the hardware components via a first signaling pathway connecting the remote access controller to the first of the hardware components; detect a failure in transmission of the firmware image to the first of the hardware components via the first signaling pathway; identify a second signaling pathway connecting the remote access controller to the first of the hardware components; resume transmission of the firmware image to the first of the hardware components via the second signaling pathway used by the remote access controller; and update firmware used to operate the first of the hardware components using the transmitted firmware image.

In additional IHS embodiments, the first signaling pathway comprises a sideband signaling pathway utilized by the remote access controller in managing the first of the hardware components. In additional IHS embodiments, the sideband signaling pathway comprises an I2C bus controlled by the remote access controller. In additional IHS embodiments, the second signaling pathway comprises an inband signaling pathway utilized by a CPU (Central Processing Unit) of the IHS in communicating with the first of the hardware components. In additional IHS embodiments, the inband signaling pathway comprises a PCIe switch fabric. In additional IHS embodiments, the first of the hardware components comprises a hardware accelerator and the firmware image comprises instructions for configurable programmable functions of the hardware accelerator. In additional IHS embodiments, the failure in transmission of the firmware image results in an inoperative state of the programmable functions of the hardware accelerator. In additional IHS embodiments, resuming transmission of the firmware image to the hardware accelerator via the second signaling pathway corrects the inoperative state of the programmable functions of the hardware accelerator. In additional IHS embodiments, wherein the failure in transmission of the firmware image to the first of the hardware components via a first signaling pathway comprises a failure in a I2C co-processor of the remote access controller, wherein the I2C co-processor manages communications on a sideband management bus of the remote access controller. In additional IHS embodiments, wherein the failure in transmission of the firmware image to the first of the hardware components via a first signaling pathway comprises a failure in a PCIe switch that implements an inband PCIe switch fabric of the IHS. In additional IHS embodiments, execution of the instructions further causes the remote access controller to: upon detecting the failure in transmission of the firmware image to the first of the hardware components via the first signaling pathway, monitor for broadcast notifications from the first of the hardware components. In additional IHS embodiments, execution of the instructions further causes the remote access controller to: select the second signaling pathway based on the broadcast notifications received from the first of the hardware components. In additional IHS embodiments, the first of the hardware components transmits the broadcast notifications on all operational communications buses available to the first of the hardware components upon detecting the failure in transmission of the firmware image.

In various additional embodiments, methods provide error recovery in updating firmware used by a managed hardware component of an Information Handling System (IHS). The methods may include: initiating, by a remote access controller of the IHS that operates separate from one or more CPUs of the IHS and that provides remote management of the IHS, an update of firmware used to operate the managed hardware component of the IHS, wherein a firmware image is transmitted to the managed hardware component via a first signaling pathway connecting the remote access controller to the managed hardware component; detecting a failure in transmission of the firmware image to the managed hardware component via the first signaling pathway; identifying a second signaling pathway connecting the remote access controller to the managed hardware component; resuming transmission of the firmware image to the managed hardware component via the second signaling pathway used by the remote access controller; and updating firmware used to operate the managed hardware component using the firmware image transmitted in part over the first signaling pathway and in part over the second signaling pathway.

In additional method embodiments, the first signaling pathway comprises a sideband signaling pathway utilized by the remote access controller in managing the managed hardware component. In additional method embodiments, the sideband signaling pathway comprises an I2C bus controlled by the remote access controller. In additional method embodiments, the second signaling pathway comprises an inband signaling pathway utilized by the one or more CPUs of the IHS in communicating with the managed hardware component. In additional method embodiments, the inband signaling pathway comprises a PCIe switch fabric.

In various additional embodiments, remote access controllers support remote management of a plurality of managed hardware components of an Information Handling System (IHS). The remote access controllers may include: a logic unit and a memory device having instructions stored thereon that, upon execution by the logic unit, cause the remote access controller to: initiate an update of firmware used to operate a first of the plurality of hardware components of the IHS, wherein a firmware image is transmitted to the first of the hardware components via a first signaling pathway connecting the remote access controller to the first of the hardware components; detect a failure in transmission of the firmware image to the first of the hardware components via the first signaling pathway; identify a second signaling pathway connecting the remote access controller to the first of the hardware components; resume transmission of the firmware image to the first of the hardware components via the second signaling pathway used by the remote access controller; and update firmware used to operate the first of the hardware components using the transmitted firmware image.

In additional remote access controller embodiments, the first signaling pathway comprises a sideband signaling pathway of the remote access controller that is used in managing the first of the hardware components.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
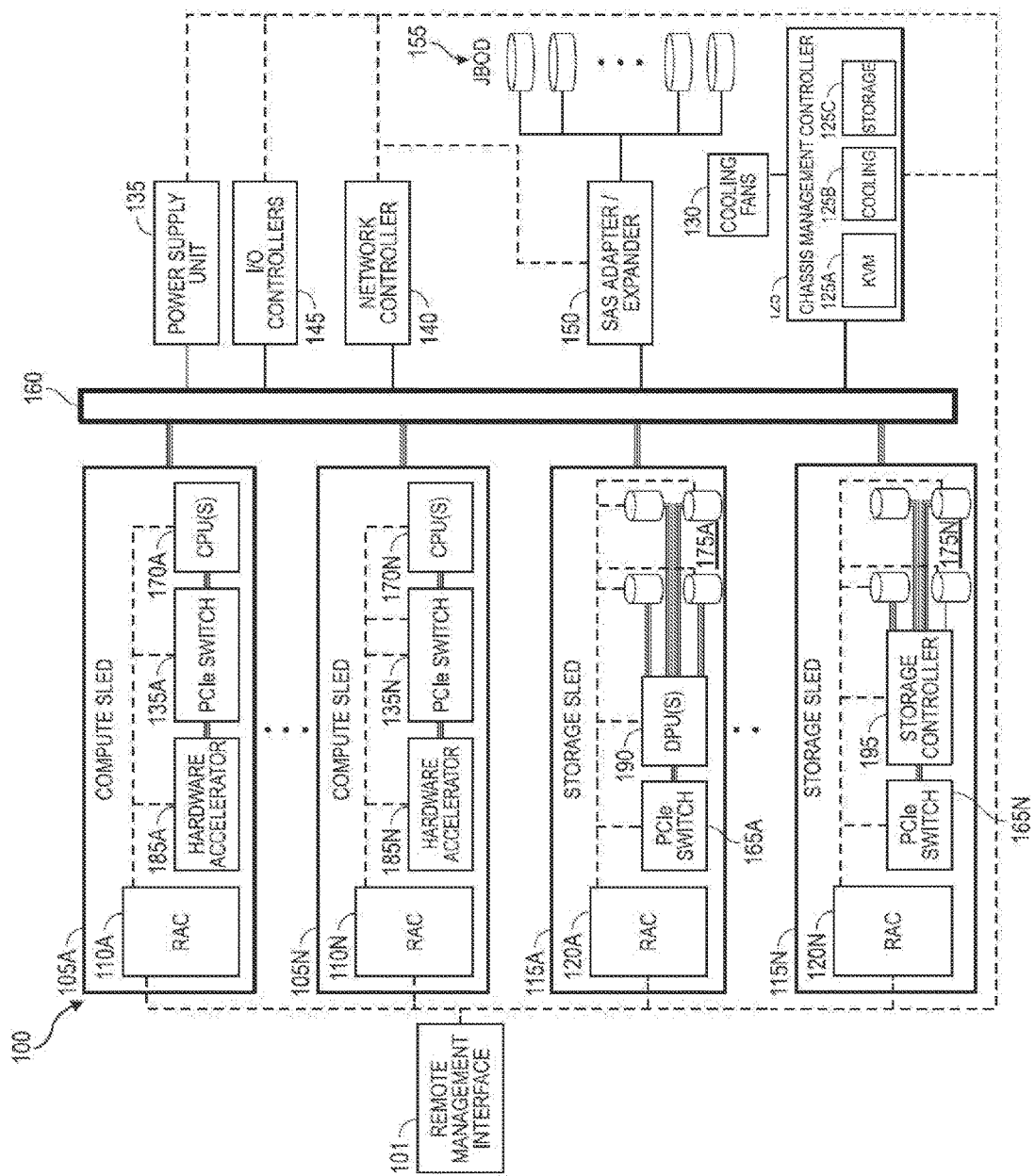
FIG. 1 is a diagram illustrating certain components of a chassis configured, according to some embodiments, for error recovery in updating firmware used by IHSs installed in the chassis.

FIG. 1 is a block diagram illustrating certain components of a chassis 100 comprising one or more compute sleds 105a-n and one or more storage sleds 115a-n that may be configured to implement the systems and methods described herein for error recovery in updating firmware used by IHSs installed in the chassis 100. Embodiments of chassis 100 may include a wide variety of hardware configurations in which one or more IHS 105a-n, 115a-n are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removeable IHSs 105a-n, 115a-n that are installed in the chassis. In addition, once the chassis 100 has been deployed, firmware used by individual hardware components of the IHSs 105a-n, 115a-n, or by other hardware components of chassis 100, may be modified in order to update the operations that are supported by these hardware components.

Chassis 100 may include one or more bays that each receive an individual sled (that may be additionally or alternatively referred to as a tray, blade, and/or node) IHSs, such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with different types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the compute sleds 105a-n and storage sleds 115a-n, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the IHSs 105a-n, 115a-n of the chassis. These high-speed data links may be used to support algorithm implementations that span multiple processing, networking and storage components of an IHS and/or chassis 100. For instance, computational tasks may be delegated to a specific processing component of an IHS, such as to a hardware accelerator 185a-n that may include one or more programmable processors that operate separate from the main CPUs 170a-n of computing sleds 105a-n. In various embodiments, such hardware accelerators 185a-n may include DPUs (Data Processing Units), GPUs (Graphics Processing Units), SmartNICs (Smart Network Interface Card) and/or FPGAs (Field Programmable Gate Arrays). These hardware accelerators 185a-n operate according to firmware instructions that may be occasionally updated, such as to adapt the capabilities of the respective hardware accelerators 185*a-n* to specific computing tasks.

Chassis 100 may be installed within a rack structure that provides at least a portion of the cooling utilized by the IHSs 105*a-n*, 115*a-n* installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105*a-n*, 115*a-n* installed within the chassis. In this manner, a rack and a chassis 100 installed within the rack may utilize various configurations and combinations of cooling fans to cool the sleds 105*a-n*, 115*a-n* and other components housed within chassis 100.

The sleds 105*a-n*, 115*a-n* may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105*a-n*, 115*a-n* to backplane 160 include PCIe couplings that support high-speed data links with the sleds 105*a-n*, 115*a-n*. In various embodiments, backplane 160 may support various types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
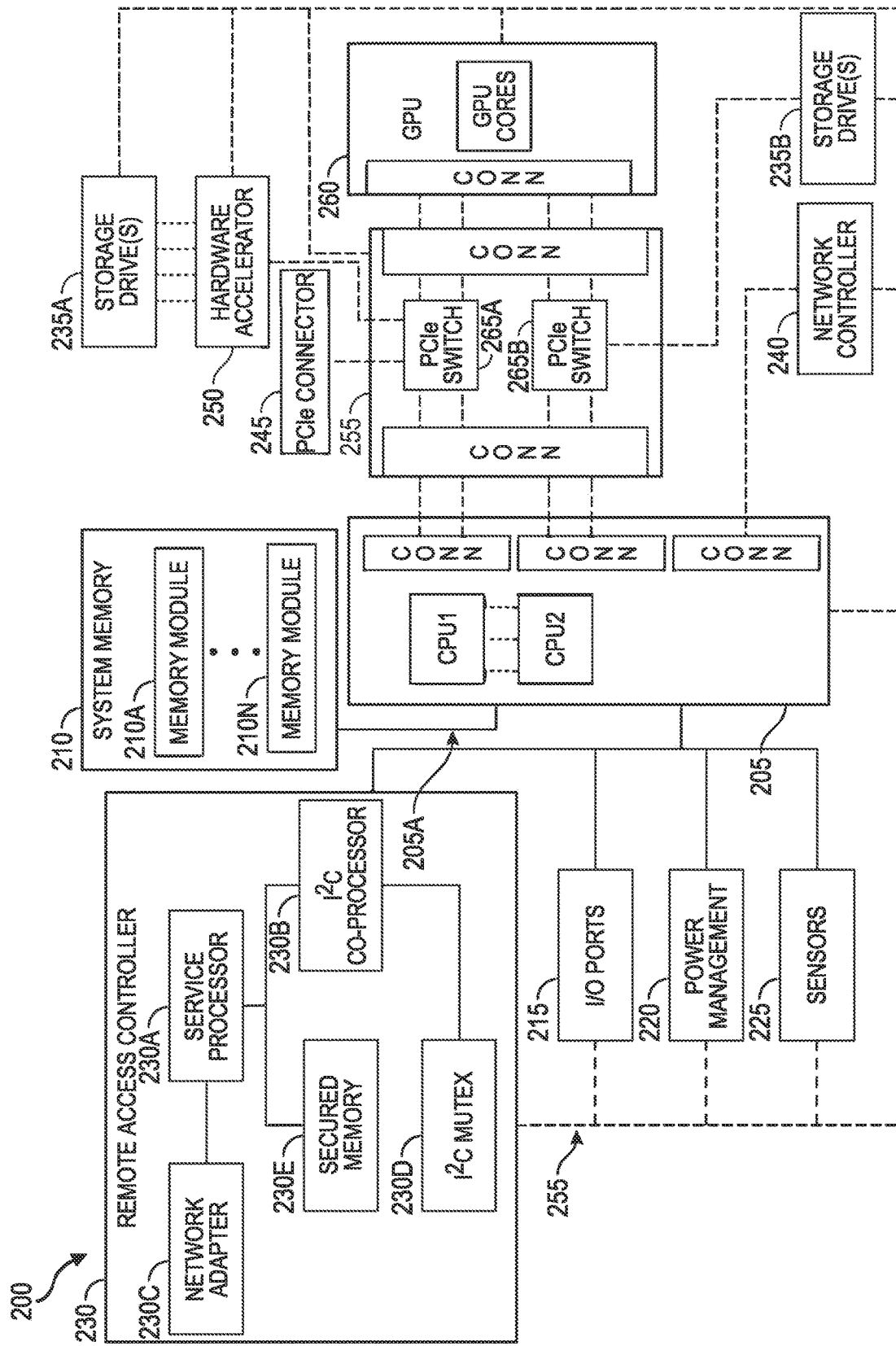
FIG. 2 is a diagram illustrating certain components of an IHS configured, according to some embodiments, for error recovery in updating firmware used by the IHS.

In certain embodiments, each individual sled 105*a-n*, 115*a-n-n* may be an IHS such as described with regard to IHS 200 of FIG. 2. Sleds 105*a-n*, 115*a-n* may individually or collectively provide computational processing resources that may be used to support a variety of e-commerce, multimedia, business and scientific computing applications, such as artificial intelligence systems provided via cloud computing implementations. Sleds 105*a-n*, 115*a-n* are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are an expected in the administration and operation of data centers, but it is preferable to avoid any downtime in making such firmware updates. For instance, in updating the firmware of the individual hardware components of the chassis 100, it is preferable that such updates can be made without having to reboot the chassis. As described in additional detail below, it is also preferable that updates to the firmware of individual hardware components of sleds 105*a-n*, 115*a-n* be likewise made without having to reboot the respective sled of the hardware component that is being updated. Moreover, embodiments provide fault tolerance for rebootless updates such that errors encountered during a rebootless update are addressed in a manner that does not require rebooting of chassis 100, and does not affect ongoing operations and management of other hardware components of chassis 100.

As illustrated, each sled 105*a-n*, 115*a-n* includes a respective remote access controller (RAC) 110*a-n*, 120*a-n*. As described in additional detail with regard to FIG. 2, remote access controller 110*a-n*, 120*a-n* provides capabilities for remote monitoring and management of a respective sled 105*a-n*, 115*a-n* and/or of chassis 100. In support of these monitoring and management functions, remote access controllers 110*a-n* may utilize both in-band and side-band (i.e., out-of-band) communications with various managed components of a respective sled 105*a-n* and chassis 100. Remote access controllers 110*a-n*, 120*a-n* may collect various types of sensor data, such as collecting temperature sensor readings that are used in support of airflow cooling of the chassis 100 and the sleds 105*a-n*, 115*a-n*. In addition, each remote access controller 110*a-n*, 120*a-n* may implement various monitoring and administrative functions related to a respective sleds 105*a-n*, 115*a-n*, where these functions may be implemented using sideband bus connections with various internal components of the chassis 100 and of the respective sleds 105*a-n*, 115*a-n*. As described in additional detail below, in various embodiments, these capabilities of the remote access controllers 110*a-n*, 120*a-n* may be utilized in updating the firmware of hardware components of chassis 100 and/or of hardware components of the sleds 110*a-n*, 120*a-n*, without having to reboot the chassis or any of the sleds 110*a-n*, 120*a-n*. In embodiments, remote access controllers 110*a-n*, 120*a-n* may implement error recovery procedures for rebootless updates, where these procedures avert any rebooting of chassis 100, or of any of the compute or storage sleds 110*a-n*, 120*a-n* installed in chassis 100, when failures are encountered during a rebootless firmware update of a managed component of chassis 100.

The remote access controllers 110*a-n*, 120*a-n* that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to the firmware utilized by all of the storage drives 175*a-n* installed in a chassis 100, or to the firmware utilized by all of the storage drives 175*a-n* of a particular model or manufacturer. In some instances, remote management interface 101 may include an inventory of the hardware, software and firmware of chassis 100 that is being remotely managed through the operation of the remote access controllers 110*a-n*, 120*a-n*. The remote management interface 101 may also include various monitoring interfaces for evaluating telemetry data collected by the remote access controllers 110*a-n*, 120*a-n*. In some embodiments, remote management interface 101 may communicate with remote access controllers 110*a-n*, 120*a-n* via a protocol such the Redfish remote management interface.

In the illustrated embodiment, chassis 100 includes one or more compute sleds 105*a-n* that are coupled to the backplane 160 and installed within one or more bays or slots of chassis 100. Each of the individual compute sleds 105*a-n* may be an IHS, such as described with regard to FIG. 2. Each of the individual compute sleds 105*a-n* may include various different numbers and types of processors that may be adapted to performing specific computing tasks. In the illustrated embodiment, each of the compute sleds 105a-n includes a PCIe switch 135a-n that provides access to a hardware accelerator 185a-n, such as the described DPUs, GPUs, Smart NICs and FPGAs, that may be programmed and adapted for specific computing tasks, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n.

As illustrated, a storage sled 115a may include one or more DPUs (Data Processing Units) 190 that provide access to and manage the operations of the storage drives 175a of the storage sled 115a. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be in integrated component of a DPU 190. The immense data storage and retrieval capabilities provided by such storage sled 115a implementations may be harnessed by offloading storage operations directed as storage drives 175a to a DPU 190a, and thus without relying on the main CPU of the storage sled, or of any other component of chassis 100. As indicated in FIG. 1, chassis 100 may also include one or more storage sleds 115n that provide access to storage drives 175n via a storage controller 195. In some embodiments, storage controller 195 may provide support for RAID (Redundant Array of Independent Disks) configurations of logical and physical storage drives, such as storage drives provided by storage sled 115n. In some embodiments, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed components of chassis 100 and/or may be installed elsewhere within a rack that houses the chassis 100. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that, in some instances, may be configured and managed individually and without implementing data redundancy across the various drives 155. The additional storage resources 155 may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed. In some instances, a chassis 100 may include numerous storage drives 175a-n, 155 that are identical, or nearly identical, such as arrays of SSDs of the same manufacturer and model. Accordingly, any firmware updates to storage drives 175a-n, 155 requires the updates to be applied within each of these topologies being supported by the chassis 100. Despite the large number of different storage drive topologies that may be supported by an individual chassis 100, the firmware used by each of these storage devices 175a-n, 155 may be occasionally updated. In some instances, firmware updates may be limited to a single storage drive, but in other instances, a set of firmware updates may be initiated for a large number of storage drives, such as for all SSDs installed in chassis 100.

In some instances, errors encountered during updates to the firmware of one hardware component of a chassis 100, may preclude or delay any additional firmware updates to other hardware components of the chassis. For example, a set of updates to the firmware utilized by twenty-five identical SSDs installed in chassis 100 may be serialized in order to support fault tolerance with respect to possible data loss. When sets of such firmware updates are serialized, any errors that are encountered during updates to the firmware of any of these SSDs prevents, or at least delays, any additional firmware updates to the remaining SSDs. This prevents data loss from multiple SSDs being simultaneously rendered inoperable due to failures in the updates for the firmware of the SSDs. Addressing such problems that may occur during firmware updates, embodiments support error recovery techniques for use in preserving rebootless update capabilities in scenarios where errors are being encountered during a rebootless firmware update.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Network controller 140 operates according to firmware instructions that may be occasionally updated.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated.

Chassis 100 may also include various I/O controllers 140 that may support various I/O ports, such as USB ports that may be used to support keyboard and mouse inputs and/or video display capabilities. Each of the I/O controllers 140 may operate according to firmware instructions that may be occasionally updated. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein for error recovery in updating firmware used by the IHS 200. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105a-n, 115a-n or other type of server, such as an 1RU server installed within a 2RU chassis, that is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line busses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

In some embodiments, network controller 240 may be a SmartNIC that includes programmable capabilities for use in offloading the processing of certain functions, such as signal processing operations or machine learning computations, from CPUs 205. In some instances, the programmable capabilities of a SmartNIC 240 may be modified through updated firmware instructions that are pushed to the SmartNIC 240. Errors encountered during such firmware updates may render the SmartNIC 240 inoperable, at least temporarily and in some cases permanently. However, in some instance, the basic I/O capabilities of the SmartNIC 240 may be unaffected by errors that are encountered during updates to the programmable capabilities of the SmartNIC. Accordingly, while errors encountered during updates to the programmable capabilities of the SmartNIC 240 may render the programmable capabilities of the SmartNIC inoperable, core I/O capabilities of the SmartNIC remain unaffected by the errors.

In some embodiments, upon detecting an error during the transmission of a firmware image for use in updating the programmable capabilities of SmartNIC 240, the SmartNIC may be configured to perform diagnostic operations that identify its communication capabilities that remain operable. The SmartNIC may be further configured to broadcast a notification on all operable communication channels in response to an error during the firmware update. As described below, the remote access controller 230 of the IHS 200 that is transmitting the firmware image to the SmartNIC 240 may detect the broadcast notifications issued by the SmartNIC and may initiate error-recovery procedures that resume transmission of the firmware image to the SmartNIC via one of the operable communication capabilities of the SmartNIC, via which a broadcast notification has been detected by the remote access controller 230.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. Each of the PCIe switches 265a-b may operate according to firmware instructions that may be occasionally updated.

Using the available PCIe lanes, the PCIe switches 265a-b may be used to implement a PCIe switch fabric. Also through this switch fabric, PCIe NVMe (Non-Volatile Memory Express) transmission may be supported and utilized in high-speed communications with SSDs, such as storage drives 235a-b, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235a-b in various topologies, in the same manner as described with regard to the chassis 100 of FIG. 1. In the illustrated embodiment, storage drives 235a are accessed via a hardware accelerator 250, while storage drives 235b are accessed directly via PCIe switch 265b. In some embodiments, the storage drives 235a-b of IHS 200 may include a combination of both SSD and magnetic disk storage drives. In other embodiments, all of the storage drives 235a-b of IHS 200 may be identical, or nearly identical. In all embodiments, storage drives 235a-b operate according to firmware instructions that may be occasionally updated.

As illustrated, PCIe switch 265a is coupled via a PCIe link to a hardware accelerator 250, such as a DPU, SmartNIC, GPU and/or FPGA, that may be a connected to the IHS via a removeable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, that may be used to implement functions used to support devices coupled to the IHS 200. In some embodiments, the processing cores of hardware accelerator 250 include ARM (advanced RISC (reduced instruction set computing) machine) processing cores. In other embodiments, the cores of DPUs 250a-b may include MIPS (microprocessor without interlocked pipeline stages) cores, RISC-V cores, or CISC (complex instruction set computing) (i.e., x86) cores. Hardware accelerator may operate according to firmware instructions that may be occasionally updated. In some instances, the programmable capabilities of hardware accelerator 250 may be modified through a firmware image that includes updated firmware instructions, where the firmware image is pushed to the hardware accelerator by the remote access controller 230. Errors encountered during such firmware updates may render the hardware accelerator 250 inoperable, at least temporarily and in some cases permanently. However, as with SmartNIC 240, the core I/O capabilities of the hardware accelerator 250 may be unaffected by errors in firmware updates to the programmable capabilities of the hardware accelerator.

In some embodiments, upon detecting an error during the transmission of a firmware image for use in updating the programmable capabilities of hardware accelerator 250, the hardware accelerator may be configured to perform diagnostic operations that identify its communication capabilities that remain operable. In the same manner as SmartNIC 240, the hardware accelerator 250 may be further configured to broadcast a notification on all operable communication channels in response to an error during the firmware update. The remote access controller 230 of the IHS 200 that is transmitting the firmware image to the hardware accelerator 250 may detect the broadcast notifications issued by the hardware accelerator 250 and may initiate error-recovery procedures. In these error-recovery procedures, the remote access controller 230 resumes transmission of the firmware image to the hardware accelerator via one of the operable communication capabilities of the hardware accelerator 250 via which a broadcast notification has been detected by the remote access controller 230.

In the illustrated embodiment, the programmable capabilities of hardware accelerator 250 implement functions used to support storage drives 235*a*, such as SSDs. In such storage drive topologies, hardware accelerator 250 may implement processing of PCIe NVMe communications with SSDs 235*a*, thus supporting high-bandwidth connections with these SSDs. Hardware accelerator 250 may also include one more memory devices used to store program instructions executed by the processing cores and/or used to support the operation of SSDs 235*a* such as in implementing cache memories and buffers utilized in support high-speed operation of these storage drives, and in some cases may be used to provide high-availability and high-throughput implementations of the read, write and other I/O operations that are supported by these storage drives 235*a*. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions.

As illustrated in FIG. 2, PCIe switches 265*a-b* may also support PCIe couplings with one or more GPUs (Graphics Processing Units) 260. Embodiments may include one or more GPU cards, where each GPU card is coupled to one or more of the PCIe switches 265*a-b*, and where each GPU card may include one or more GPUs 260. In some embodiments, PCIe switches 265*a-b* may transfer instructions and data for generating video images by the GPUs 260 to and from CPUs 205. Accordingly, GPUs 260 may include on or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated. As with hardware accelerator 250 and SmartNIC 240, the programmable capabilities of GPUs 260 may be modified through a firmware image that includes updated firmware instructions and that is pushed to the GPU 260 by the remote access controller 230. However, as with SmartNIC 240 and hardware accelerator 250, the core I/O capabilities of the GPUs 260 may be unaffected by errors in firmware updates to the programmable capabilities of these GPUs.

In some embodiments, upon detecting an error during the transmission of a firmware image for use in updating the programmable capabilities of GPUs 260, the GPUs may be configured to perform diagnostic operations that identify its communication capabilities that remain operable. In the same manner as SmartNIC 240 and hardware accelerator 250, the GPUs 260 may be further configured to broadcast a notification on all operable communication channels in response to an error during the firmware update. The remote access controller 230 of the IHS 200 that is transmitting the firmware image to the GPUs 260 may detect the broadcast notifications and may initiate error-recovery procedures. In these error-recovery procedures, the remote access controller 230 resumes transmission of the firmware image to the GPUs 260 via one of the operable communication capabilities via which a broadcast notification has been detected by the remote access controller 230.

As illustrated in FIG. 2, PCIe switches 265*a-b* may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to IHS. Through couplings to PCIe connectors 245*a*, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and management tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for updating firmware used by managed hardware components of IHS 200, may operate using validated instructions, and thus within the root of trust of IHS 200.

In some embodiments, remote access controller 230 may include a service processor 230*a*, or specialized microcontroller, that operates management software that supports remote monitoring and administration of IHS 200. The management operations supported by remote access controller 230 may be remotely initiated, updated and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 255 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230*e* for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 255. In some instances, the sideband management connections supported by remote access controller 230 may include PLDM (Platform Level Data Model) management communications with the managed devices 205, 235a-b, 240, 250, 255, 260 of IHS 200. In some embodiments, the remote access controller 230 may additionally or alternatively use MCTP messaging to transmit Vendor Defined Messages (VDMs) via the in-line PCIe switch fabric supported by PCIe switches 265a-b.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 255 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus interface 255. For instance, messages utilized in device and/or system management may be transmitted using I2C sideband bus 255 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or directly, via in-line buses that are separate from the I2C sideband bus 255 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement a I2C bus interface used to support communications with managed hardware components 205, 235a-b, 240, 250, 255, 260 of IHS. In some embodiments, the I2C co-processor 230b may be an integrated circuit on the same die as the service processor 230a, such as a peripheral system-on-chip feature that may be provided by the service processor 230a. The sideband I2C bus 255 is illustrated as single line in FIG. 2. However, sideband bus 255 may be comprises of multiple signaling pathways, where each may be comprised of a clock line and data line that couple the remote access controller 230 to I2C endpoints 205, 235a-b, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
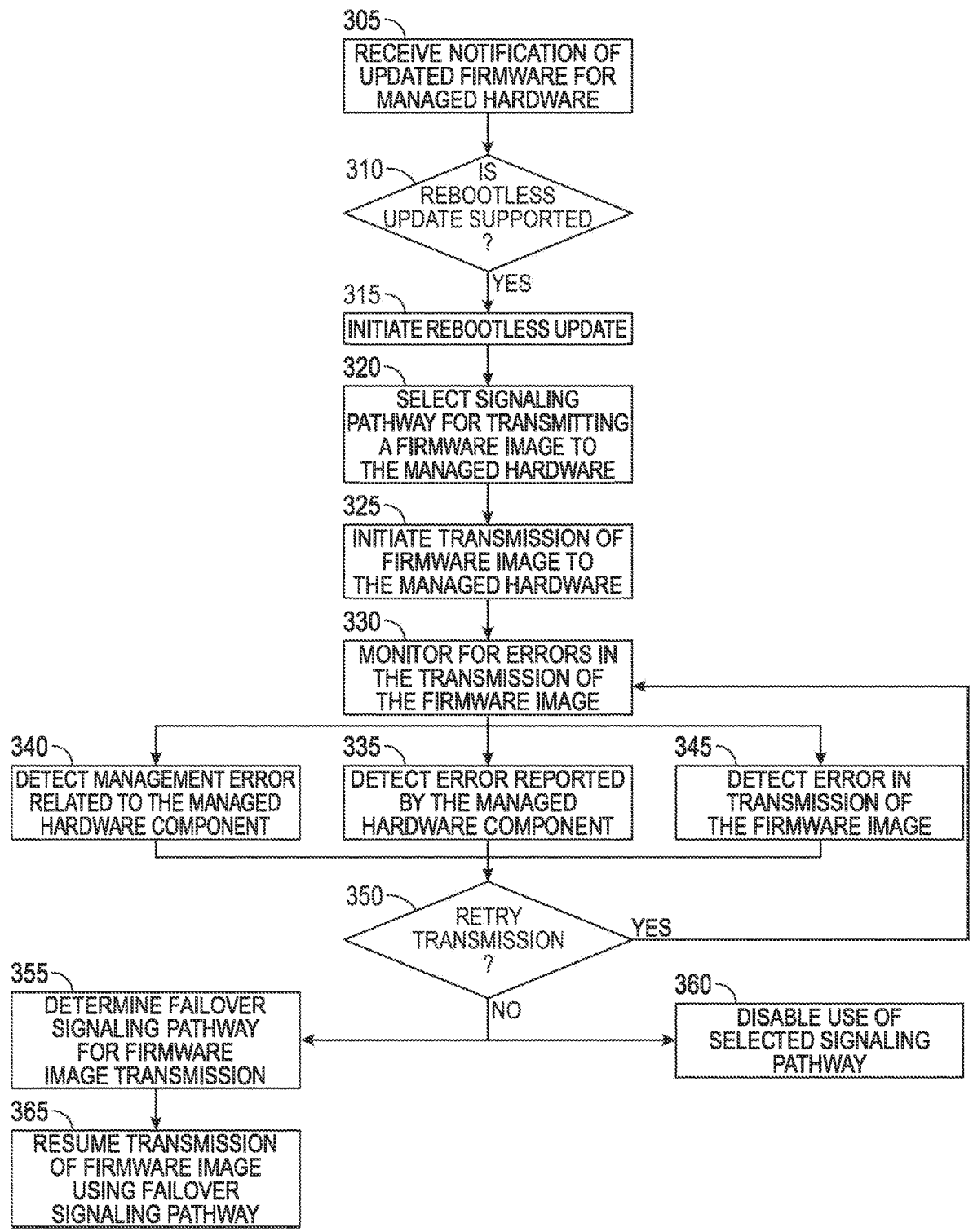
FIG. 3 is a flowchart describing certain steps of a method, according to some embodiments, for error recovery in updating firmware used by an IHS.

FIG. 3 is a flowchart describing certain steps of a method, according to some embodiments, for error recovery during rebootless updates to firmware used by hardware components of an IHS, such as the IHSs described with regard to FIGS. 1 and 2. Embodiments may begin, at 305, with the receipt of a notification that updated firmware is available for a managed hardware component of an IHS. As described above, an IHS may include a remote access controller that provides remote management of an IHS, and in many instances, also provides remote management of individual hardware components of an IHS. In embodiments, such a remote access controller of an IHS is tasked with updating firmware that is utilized by managed hardware components of the IHS.

As described, data center administrators may utilize remote management tools to push firmware updates to managed hardware components operating within the data center. For example, a data center administrator may initiate operations for updating the firmware utilized by all SSDs of a certain type within a chassis (that may include over 20 SSDs), where the firmware update may be initiated in order to address a security vulnerability in a particular type of SSD, such as SSDs of a specific model number. In other instances, the firmware updates that are distributed using remote management tools may include firmware that reprograms operations of a re-programmable computing device installed in the IHS, such as the hardware accelerator, GPUs and SmartNIC described with regard to FIG. 2. Such various types of firmware updates may be pushed to the remote access controllers of the IHSs that include the particular type of hardware component that meet the criteria set forth for the firmware update, with the remote access controllers then responsible for completing the updates to the firmware of managed hardware components of the IHS.

Once a notification of firmware updates to a managed component of an IHS have been received, at 310, the remote access controller determines whether the firmware update can be completed using a rebootless firmware update. Certain hardware components of an IHS may support rebootless updates, while other hardware components may be limited to legacy firmware update techniques that require rebooting of the IHS and/or chassis in which the hardware component is installed. In instances where rebootless firmware updates are supported, at 315, the remote access controller initiates the rebootless firmware update, such as through a set of commands that are issued by the remote access controller to the managed hardware component.

At 320, the remote access controller selects a signaling pathway by which to transmit a firmware image to the managed hardware component, where the firmware image is a file that must be received by the managed hardware component in its entirety before the firmware update can be completed. As described with regard to FIG. 2, a remote access controller 230 may utilize multiple signaling pathways for interfacing with a managed hardware component. For example, a remote access controller may utilize a sideband management channel to interface with a managed hardware component, such as an I2C bus that is used exclusively by the remote access controller in providing management of the managed hardware component. In addition, the remote access controller may use any of the available in-band signaling pathways to transmit information to a managed hardware component. Available in-band signaling pathways may provide superior transmission speeds and bandwidth in comparison to lower-throughput sideband management signaling pathways. However, these in-band signal pathways are shared resources and thus subject to contention. For instance, a remote access controller may utilize a PCIe switch fabric in transmitting data to a managed hardware component of an IHS. This PCIe switch fabric provides a high-speed and high-bandwidth communication channel for transmission of firmware images. But, all transmissions on the PCIe switch fabric by the remote access controller are subject to bandwidth availability. Accordingly, embodiments may select a signal pathway for transmission of a firmware based on bandwidth availability, and also based on reliability of the available signaling pathways.

Using the selected signaling pathway, at 325, the remote access controller initiates transmission of the firmware image to the managed hardware component. Firmware images may be relatively large files that may take several minutes to transmit to the managed hardware component, regardless of the signaling pathway that is selected for transmitting the file. If the firmware image is transmitted solely over a relatively low bandwidth sideband management bus, a firmware image may take tens of minutes to transmit to a hardware component. During this interval during which the firmware image is being transmitted, numerous types of errors can occur in the IHS, elsewhere withing a shared chassis, in the remote access controller, in the managed hardware component and/or in another hardware component that shares use of the signaling pathway being used to transmit the firmware image. Due to such errors, transmission of the firmware image may leave the managed hardware component in an undefined and/or inoperable state that requires manual administration of the device, and in some instances, may render the managed hardware component as permanently inoperable. Accordingly, recovery from errors during transmission of firmware images according to embodiments serves to maintain a managed hardware component in service, while avoiding manual intervention that requires taking an IHS out of service. Additionally, when the transmission of firmware images is part of a rebootless firmware update, recovery from errors during transmission of a firmware image preserves the seamless aspect of the rebootless firmware update such that operations of an IHS are not otherwise affected by the error encountered during the firmware update to a managed hardware component.

Embodiments may continue, at 330, by the remote access controller monitoring for errors encountered during transmission of the firmware image. As described with regard to FIG. 2, a remote access controller may be configured with multiple mechanisms for interfacing with managed hardware components of an IHS, including sideband and inband signaling pathways. Accordingly, during transmission of a firmware image to a managed hardware component, a remote access controller may initiate a suite of procedures that monitor for various types of errors that may be indicative of a failure in the transmission of the firmware image.

As indicated, at 340, the remote access controller may detect errors that relate to the management of the hardware component by the remote access controller. As described, remote management of a managed hardware component may be supported using protocols such as Redfish. In such instances, a remote management protocol may signal an error upon detecting an error in a managed hardware component, or upon losing connectivity with the managed hardware component. While the transmission of a firmware image to a managed hardware component is ongoing, remote access controller embodiments may monitor for any such errors or warnings that are generated by a remote management interface with respect the component.

In some instances, management errors related to the managed hardware component may be generated by the remote access controller directly. For instance, management of the hardware component by the remote access controller by include use of a heartbeat signal this is periodically generated by the managed hardware component and monitored by the remote access controller. Upon detecting any failure in this heartbeat signal during the transmission of the firmware image to the managed hardware component, the remote access controller may initiate error-recovery procedures.

In some embodiments, the remote access controller may infer an error, or an impending error, in the transmission of the firmware image to the managed hardware component. In some instances, blocks of the firmware image may be transmitted to the managed hardware component in response to requests from the hardware component, where these requests indicate the hardware component is ready to receive an additional portion of the firmware image. In some instances, each request may specify a number and/or size of firmware image blocks for transmission. In such instances, the remote access controller may monitor for the rate at which such requests are being received from the managed hardware component, as well as the sizes of the requested blocks of the firmware image. In some embodiments, the remote access controller may signal an error in the firmware transmission upon detection a slowing in the rate of requests and/or in the size of the requested blocks that indicate that the transmission of the firmware image will not be completed within a reasonable amount of time. In some instances, a reasonable amount of time for transmission of a firmware image may be determined by the remote access controller based on the bandwidth availability of failover signaling pathways that may be able to compete the transmission more quickly, such as within half the time than will be required using the slowed rate of transfer in the signaling pathway currently in use.

In another example, a remote access controller may detect an internal error during transmission of a firmware image, where the internal error will prevent completion of the transmission. As described with regard to FIG. 2, a remote access controller may utilize a I2C mutex 230*d* and I2C co-processor 230*b* in implementing sideband management connections with managed hardware components of an IHS. In instances where the firmware image is being transmitted using a sideband management connection supported by the remote access controller, a failure in the I2C mutex or co-processor may halt the ongoing transmission of a firmware image to a managed hardware component. In embodiments, the remote access controller monitors for various such types of internal errors during a firmware transmission and may initiate error-recovery procedures upon detecting such an error.

As indicated in FIG. 3, embodiments may also monitor for errors reported by the managed hardware component during transmission of a firmware image to that hardware component. In some instances, a managed hardware component may signal an error condition on a sideband and/or inband bus upon detecting an internal error. During transmission of a firmware image to the hardware component, the component may report an error in the communication protocol or the communication bus utilized by the component in receiving the transmitted firmware image. For instance, the managed hardware component may signal an error on a sideband management bus upon detecting a failure of an inband communication interface, such as a failure of a PCIe link supported by a PCIe switch of the IHS. In instances where the firmware image is being transmitted to the managed hardware component using the inband PCIe link, a reported failure in this PCIe signaling pathway results in embodiments initiating error-recovery procedures and to complete transmission of the firmware image to the component.

In another example, a remote access controller may detect an error reported by a managed hardware component that indicates a failure by a management controller of that hardware component. Some managed hardware components, such as an hardware accelerator, may include a specialized management controller that interfaces with the remote access controller in support of remote management of various aspects of the operation of the hardware accelerator. For instance, the management controller of the hardware accelerator may be used to reprogram computational capabilities of the hardware accelerator. Upon detecting a failure by such a management controller, the managed hardware component may signal an error condition that is monitored by the remote access controller and that triggers error-recovery procedures. As described with regard to FIG. 2, such failures in updating firmware used to program may render as inoperable the programmable functions of the hardware accelerator, while the core I/O capabilities may remain functional.

As indicated in FIG. 3, embodiments may also monitor for errors generated by the transmission protocol that is being used to transmit a firmware image to the managed hardware component. In some instances, the remote access controller may select the sideband I2C management bus as the initial communications protocol utilized for transmission of the firmware image to the managed hardware component. In such instances, the remote access controller monitors the I2C bus for transmission errors reported on the bus, such as I2C timeout errors or malformed packet errors. In instances where an inband PCIe bus has been selected for transmission of a firmware image, the remote access controller monitors for errors reported by the PCIe switch and by the root of the PCIe switch fabric, such as the CPU of the IHS. In particular, the remote access controller monitors for PCIe errors that originate or otherwise pertain to the managed hardware component, where these errors are indicative a failure in the transmission of the firmware image to the managed hardware component.

As illustrated in FIG. 3, at 350, upon detecting any type of error that indicates a failure in the transmission of a firmware image, the remote access controller determines whether to retry all or a portion of the firmware transmission. In some instances, certain errors may warrant attempts to resume transmission of the firmware image to the hardware component. For example, an error detected in the PCIe switch fabric may be the result of transient conditions in the switch fabric. In such instances, retrying the transmission may be sufficient to circumvent the transient conditions that caused the error. Accordingly, embodiments may implement configurable numbers of retry attempts for different types of errors that may be detected. For example, five retry attempts may be configured for inband signaling pathway errors, such as PCIe transmission errors, two retry attempts may be configured for sideband signaling pathway errors and zero retry attempts may be made for errors indicating a failure of a signaling pathway, such as an error in the I2C co-processor of a remote access controller, that warrants immediate initiation of error recovery procedures.

In scenarios where no further transmission retries will be attempted in response to a detected error in the transmission of a firmware image, at 360, embodiments may disable further use of the signaling pathway in the transmission of firmware images. For instance, detection of repeated errors in the I2C co-processor or repeated time-out errors reported on the I2C bus may result in embodiments disabling use of sideband management connections for the transmission of firmware images. In this same manner, detection of repeated errors reported by a management controller of the managed hardware component may result in embodiments disabling use of sideband management connections with this specific hardware component, while use of sideband management connections remains enabled for firmware image transmissions with other managed hardware components.

As indicated in FIG. 3, in addition to disabling use of a signaling pathway, at 355, embodiments also determine a failover signaling pathway for completing transmission of the firmware image to the managed hardware component. In instances where errors have been detected in a transmission of a firmware image via a sideband management connection, the remote access controller may initiate a switch to use of an inband signaling pathway for resumption of transmission of the firmware image. As described, some hardware components may be configured to broadcast a notification on all available signaling pathways in response to detecting an error during transmission of a firmware image to the component. In some embodiments, the broadcast notifications issued by a managed hardware component may specify the portion of the firmware image that was successfully received by the hardware component prior to the error, thus providing the remote access controller with information for determining the remaining portion of the firmware image to be transmitted via the failover pathway. In some embodiments, the broadcast notifications may specify whether, in light of the error condition, the updated can be completed using a rebootless firmware update, or whether rebooting is needed to recover from the error condition. If the broadcast notifications indicate a reboot is needed, the remote access controller may attempt to reinitialize the hardware component and to restart the transmission of the firmware image via a failover signaling pathway in order to avert the reboot condition. In this manner, the remote access controller monitors all known signaling pathways in response to detecting an error in the transmission of a firmware image to a managed hardware component, where the remote access controller may detect broadcast notifications that are used to identify a failover signaling pathway and that specify other recovery conditions.

Upon detecting broadcast notifications generated by the managed hardware component, certain remote access controller embodiments select from the operational signaling pathways on which the broadcast notification has been detected as a failover signaling pathway on which to resume transmission of the firmware image. In other instances, remote access controller embodiments may identify operational signaling pathways for use as a failover signaling pathway based on other detected transmission by the managed hardware component. For instance, a sideband signaling pathway may be selected as a failover pathway for a firmware transmission based on the detection of heartbeat signals that are periodically generated by a managed hardware component of an IHS and that may be broadcast on a sideband management bus by the component. Based on these heartbeat signals, the remote access controller may identify functioning signaling pathways that may be used as failover signaling pathways.

Upon selection of the failover signaling pathway, at 365, the remote access controller resumes transmission of the firmware image to the managed hardware component. Once the complete firmware image has been received by the managed hardware component, the rebootless update to the firmware of the component may be resumed, thus preserving the ability to complete the rebootless update of the firmware of the hardware component.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An IHS (Information Handling System) comprising:
one or more CPUs utilizing one or more buses that connect to a plurality of hardware components of the IHS;
a first of the plurality of hardware components of the IHS; and
a remote access controller supporting remote management of the plurality of hardware components of the IHS, the remote access controller comprising a logic unit and a memory device having instructions stored thereon that, upon execution by the logic unit, cause the remote access controller to:
initiate an update of firmware used to operate the first of the hardware components of the IHS, wherein a firmware image is transmitted to the first of the hardware components via a first signaling pathway connecting the remote access controller to the first of the hardware components;
detect a failure in transmission of the firmware image to the first of the hardware components via the first signaling pathway;
upon detecting the failure in transmission of the firmware image to the first of the hardware components via the first signaling pathway, monitor for broadcast notifications from the first of the hardware components, wherein broadcast notifications received from the first of the hardware components indicate whether the failure in transmission of the firmware image results in an error condition requiring a reboot of the first of the hardware components;
based on the monitoring for broadcast notifications, identify a second signaling pathway connecting the remote access controller to the first of the hardware components;
resume transmission of the firmware image to the first of the hardware components via the second signaling pathway used by the remote access controller; and
update firmware used to operate the first of the hardware components using the transmitted firmware image.

2. The IHS of claim 1, wherein the first signaling pathway comprises a sideband signaling pathway utilized by the remote access controller in managing the first of the hardware components.

3. The IHS of claim 2, wherein the sideband signaling pathway comprises an I2C bus controlled by the remote access controller.

4. The IHS of claim 2, wherein the second signaling pathway comprises an inband signaling pathway utilized by a CPU (Central Processing Unit) of the IHS in communicating with the first of the hardware components.

5. The IHS of claim 4, wherein the inband signaling pathway comprises a PCIe switch fabric.

6. The IHS of claim 1, wherein the first of the hardware components comprises a hardware accelerator and the firmware image comprises instructions for configurable programmable functions of the hardware accelerator.

7. The IHS of claim 6, wherein the failure in transmission of the firmware image results in an inoperative state of the programmable functions of the hardware accelerator.

8. The IHS of claim 7, wherein resuming transmission of the firmware image to the hardware accelerator via the second signaling pathway corrects the inoperative state of the programmable functions of the hardware accelerator.

9. The IHS of claim 1, wherein the failure in transmission of the firmware image to the first of the hardware components via a first signaling pathway comprises a failure in a I2C co-processor of the remote access controller, wherein the I2C co-processor manages communications on a sideband management bus of the remote access controller.

10. The IHS of claim 1, wherein the failure in transmission of the firmware image to the first of the hardware components via a first signaling pathway comprises a failure in a PCIe switch that implements an inband PCIe switch fabric of the IHS.

11. The IHS of claim 1, wherein the first of the hardware components transmits the broadcast notifications on all operational communications buses available to the first of the hardware components upon detecting the failure in transmission of the firmware image.

12. A method for error recovery in updating firmware used by a managed hardware component of an Information Handling System (IHS), the method comprising:
   initiating, by a remote access controller of the IHS that operates separate from one or more CPUs of the IHS and that provides remote management of the IHS, an update of firmware used to operate the managed hardware component of the IHS, wherein a firmware image is transmitted to the managed hardware component via a first signaling pathway connecting the remote access controller to the managed hardware component;
   detecting a failure in transmission of the firmware image to the managed hardware component via the first signaling pathway;
   upon detecting the failure in transmission of the firmware image to the first of the hardware components via the first signaling pathway, monitoring for broadcast notifications from the first of the hardware components, wherein broadcast notifications received from the first of the hardware components indicate whether the failure in transmission of the firmware image results in an error condition requiring a reboot of the first of the hardware components;
   based on the monitoring for broadcast notifications, identifying a second signaling pathway connecting the remote access controller to the managed hardware component;
   resuming transmission of the firmware image to the managed hardware component via the second signaling pathway used by the remote access controller; and
   updating firmware used to operate the managed hardware component using the firmware image transmitted in part over the first signaling pathway and using the resumed transmission of the firmware image via the second signaling pathway.

13. The method of claim 12, wherein the first signaling pathway comprises a sideband signaling pathway utilized by the remote access controller in managing the managed hardware component.

14. The method of claim 13, wherein the sideband signaling pathway comprises an I2C bus controlled by the remote access controller.

15. The method of claim 12, wherein the second signaling pathway comprises an inband signaling pathway utilized by the one or more CPUs of the IHS in communicating with the managed hardware component.

16. The method of claim 15, wherein the inband signaling pathway comprises a PCIe switch fabric.

17. A remote access controller supporting remote management of a plurality of managed hardware components of an Information Handling System (IHS), the remote access controller comprising:
   a logic unit and a memory device having instructions stored thereon that, upon execution by the logic unit, cause the remote access controller to:
      initiate an update of firmware used to operate a first of the plurality of hardware components of the IHS, wherein a firmware image is transmitted to the first of the hardware components via a first signaling pathway connecting the remote access controller to the first of the hardware components;
      detect a failure in transmission of the firmware image to the first of the hardware components via the first signaling pathway;
      upon detecting the failure in transmission of the firmware image to the first of the hardware components via the first signaling pathway, monitor for broadcast notifications from the first of the hardware components, wherein broadcast notifications received from the first of the hardware components indicate whether the failure in transmission of the firmware image results in an error condition requiring a reboot of the first of the hardware components;
      based on the monitoring for broadcast notifications, identify a second signaling pathway connecting the remote access controller to the first of the hardware components;
      resume transmission of the firmware image to the first of the hardware components via the second signaling pathway used by the remote access controller; and
      update firmware used to operate the first of the hardware components using the transmitted firmware image.

18. The remote access controller of claim 17, wherein the first signaling pathway comprises a sideband signaling pathway of the remote access controller that is used in managing the first of the hardware components.

* * * * *